April 10, 1956  M. S. JOHNSON  2,741,284
CUT-OUT JIG CLAMP
Filed April 16, 1953   3 Sheets-Sheet 2
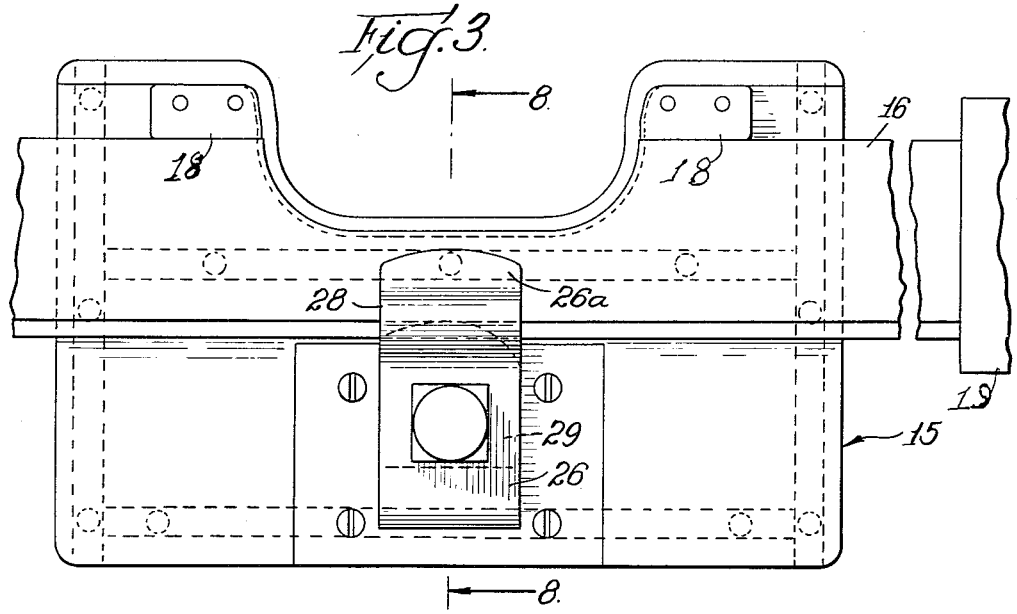
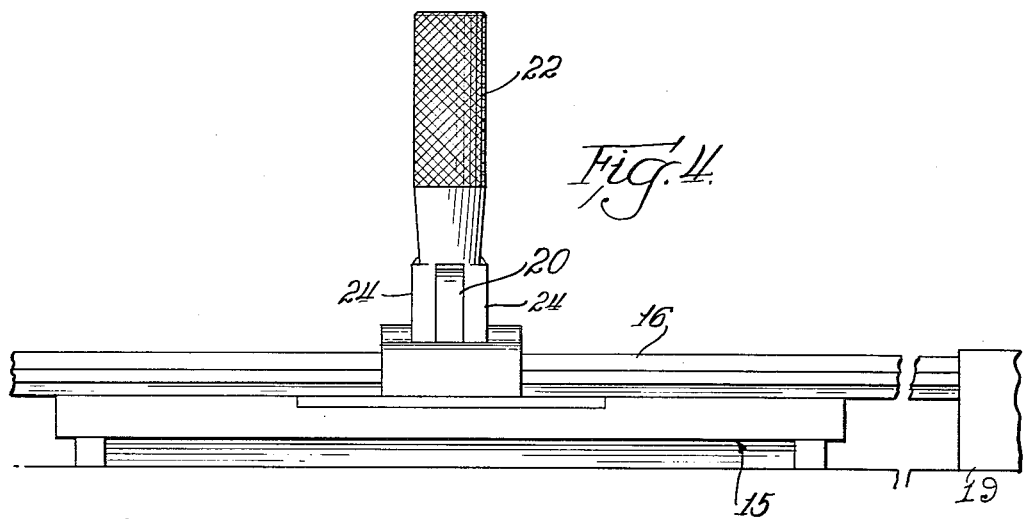
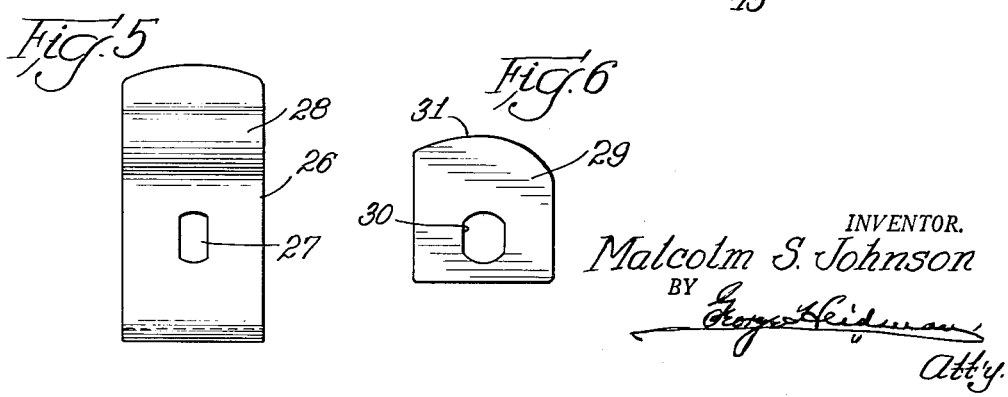
INVENTOR.
Malcolm S. Johnson
BY George Heidman
Att'y.

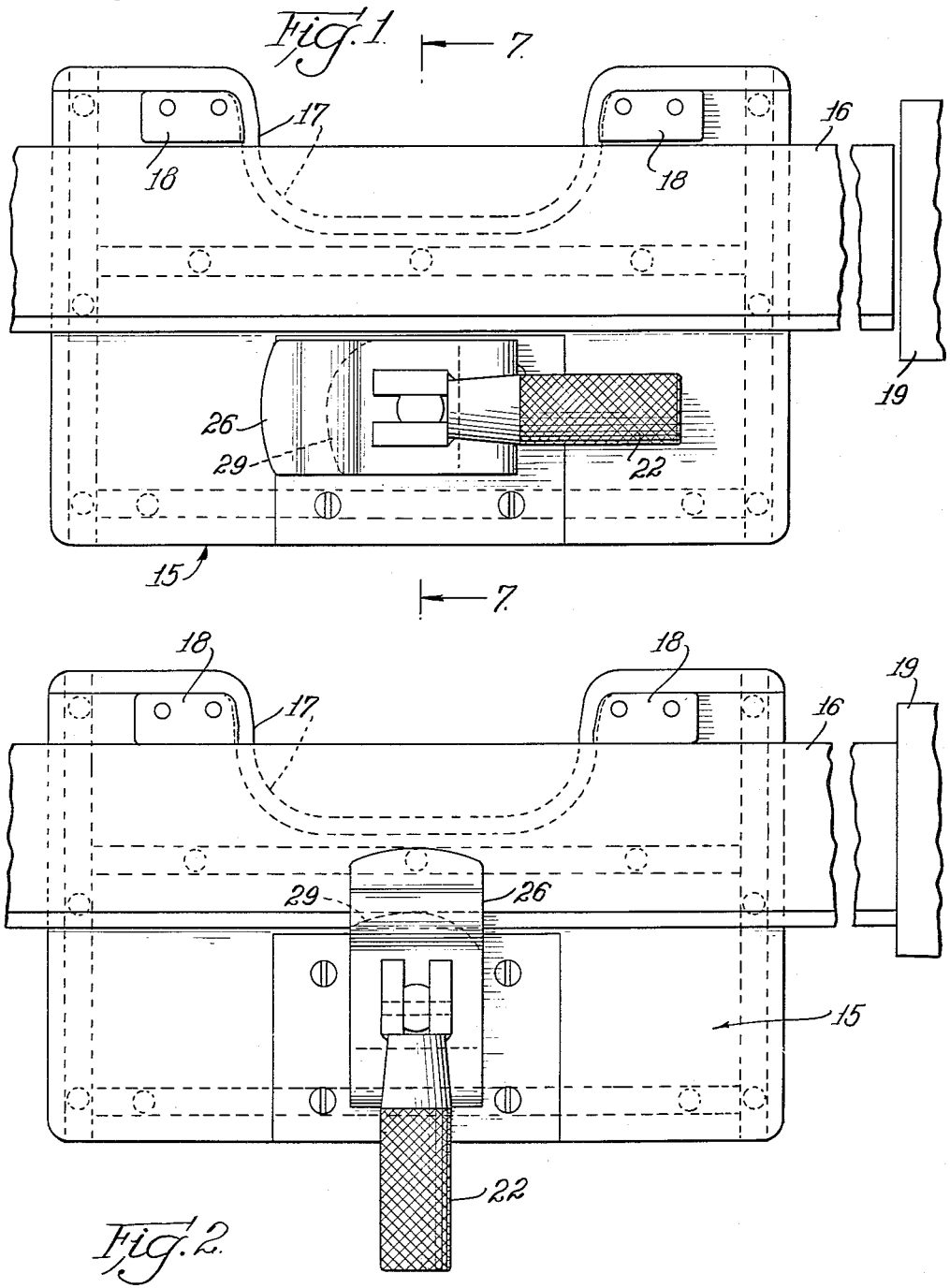

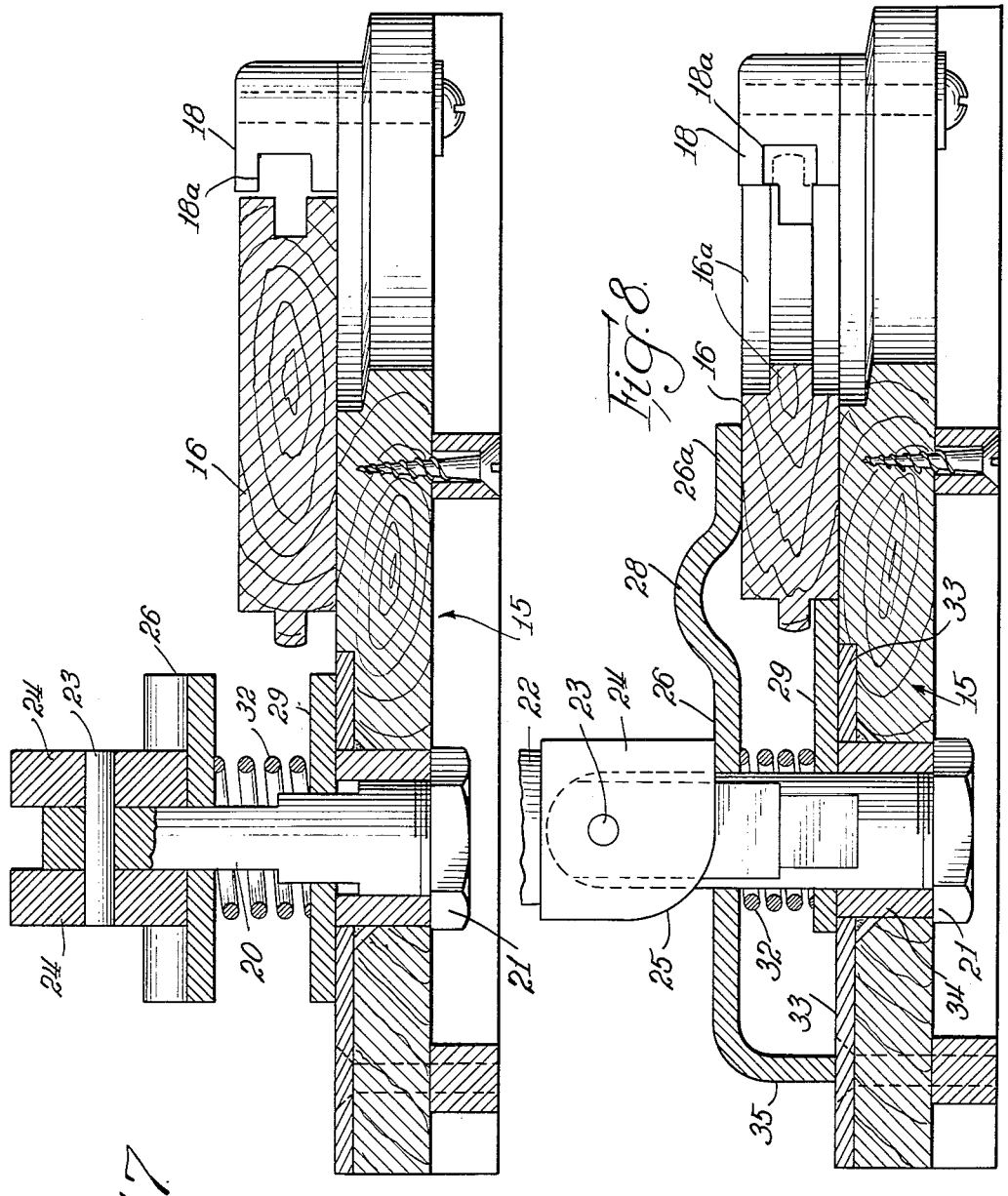

United States Patent Office 2,741,284
Patented Apr. 10, 1956

2,741,284

CUT-OUT JIG CLAMP

Malcolm S. Johnson, Flossmoor, Ill., assignor to Illinois Railway Equipment Company, Chicago, Ill., a corporation of Illinois Application April 16, 1953, Serial No. 349,129

5 Claims. (Cl. 144—144.5)

My invention relates to a jig clamp for properly positioning and clamping the material, wood or metal, in place during the operation of cutting out a preselected portion of the flat metal sheet or wood board in conformity with the selected template.

In the working of wood or metal, it is necessary to position and clamp the board to a jig or template, the workman being required to exercise great care in properly positioning the board and then firmly clamping the board on the jig in order to ensure a true cut-out to be made and that all cut-outs be uniform in contour and of identical measurements. In other words, the proper positioning of the board against the stops on the jig or template before clamping the board tightly in place is absolutely necessary, as any slight spacing of the board from the jig or template stops would result in an incorrect cut-out.

My invention is designed to overcome the possibility of the workman's carelessness in properly positioning the work firmly against the stops of the jig; the invention contemplating means whereby the work will be properly positioned and firmly clamped in place by the single operation of the clamp-controlling lever.

The invention, for purposes of exemplification, is shown applied to a jig especially adapted for use in providing the tongue-and-groove lining boards as employed in railroad house cars with prearranged cut-outs and in this instance to provide the lining boards at preselected points with cut-outs of predetermined contour in keeping with the configuration of the lading tie anchors which are to be embedded in and flush with the car lining and effect clamping or interengaging relation with portions of the lining boards adjacent the cut-outs.

In the accompanying drawings:

Figure 1 is a plan view of a jig with a board in place and my improved clamping and positioning means in non-clamping position.

Figure 2 is a similar view with my improved means in partial clamping position.

Figure 3 is a top plan view with the board provided with the cut-out and in full clamped position.

Figure 4 is a side or edge elevation of the device as shown in Figure 3.

Figure 5 is a detail plan view of the board clamping element.

Figure 6 is a detail plan view of the board-positioning cam element.

Figure 7 is a transverse sectional view taken along the line 7—7 of Figure 1, on a somewhat larger scale and the board to be operated on in unclamped condition.

Figure 8 is a transverse sectional view taken on the line 8—8 of Figure 3.

In the operation of providing material, either metal or wood boards with prescribed cut-outs and especially cut-outs in the wood lining boards of railroad house cars preparatory to the application of countersunk lading tie anchors of a given configuration, it is necessary to properly position and firmly clamp the work on the jig or template. That is to say, the workman or operator must exercise care in properly positioning the material or board and then clamp it firmly in proper position before beginning the cutting operation.

As my improved clamp, as illustrated, is primarily designed for cut-out jig operation on railroad house car lining boards, which generally are of considerable length, the template 15 is shown with a superposed portion 16 of a lining board.

The railroad car lining boards are usually of the tongue-and-groove type and of more or less uniform width and thickness; and as certain of the lading tie anchors at present in use are of oblong or elongated configuration, as shown in Patent Re. 24,032 issued July 5, 1955, I show the template 15 with a concavity or recess at 17, see Figures 1 and 2, and provided with work positioning stops 18, 18 arranged adjacent opposite sides or ends of the recess 17, and preferably removably secured in place.

The jig or a suitable rigid stop or abutment for the end of the board 16 is shown at 19.

The template or jig at a suitable distance removed from the recess 17, transversely of the template and a distance approximating or slightly greater than the width of the plane or main portion of the lining board 16, is provided with board positioning and clamping means involving a rotatably mounted vertical post 20, see Figures 7 and 8, held against vertical movement in any suitable manner, as shown for example at 21. The upper exposed end of the post 20 is provided with an operating handle 22, pivotally secured thereto at 23, while the lower end of the handle is shown longitudinally slotted to receive the end of post 20 between the ears 24, 24. The handle 22 being pivotally connected with the verticallyy immovable post 20, so as to permit the handle to swing through a vertically disposed arc.

The ears 24, 24 at their lower forward surfaces are made arcuate, as shown at 25, to provide a downward cam action when the handle 22 is swung upwardly from the position shown in Figure 2 to the position shown in Figure 4.

The post 20 adjacent its upper end is provided with a reduced or non-circular portion to receive the clamp member or presser plate 26 shown in detail in Figure 5.

The presser plate 26 preferably consists of a comparatively wide and rigid steel plate provided with a rectangular slot 27 to receive the reduced flat sided portion at the upper end of the rotatable post 20 and thus cause plate 26 to swing or rotate with post 20 when the operator swings hand member 22. The forward or work-engaging end of the presser member 26 is shown preferably formed with a transversely disposed vertical curvature 28, facing downwardly so as to arrange the outer end of the plate in the same or approximately the same horizontal plane as the body of the plate. The plate 26 is adapted to move vertically on post 20.

The non-circular portion of the post 20 also is provided with a cam plate or member 29 (shown in detail in Figure 6) provided with a slot or non-circular opening 30 and a forward arcuate cam action surface 31; the member 29 being adapted to rotate or turn with post 20.

The post 20, intermediate presser member or elongated plate 26 and cam member 29, is provided with a coil spring 32, see Figures 7 and 8, which exerts spacing pressure between plates 26 and 29 and thus yieldingly holding and returning plate 26 to its normal raised position shown in Figure 7; cam plate 29 remaining flush with the top of template 15 which preferably is provided with a smooth and countersunk wear plate 33 and a post receiving ferrule 34.

As previously stated, for purposes of exemplification, my improved device is especially adapted for use with tongued-and-grooved lining boards and hence the work stops 18, 18 are shown grooved at 18ª on their forward board-contacting edges as shown in Figures 7 and 8, for the purpose of receiving the longitudinal tongue of a lining board. The forwardly presented edges are to be cut out and the perimeters of the cut-outs gained to provide a tongue as at 16ª adapted to fit into a perimetrical groove or between the front and rear plates or surfaces of a tie-receiving anchor.

Before the work or board is placed on the template, the handle 22 is swung into the inoperative position shown in Figure 1, thereby rotating post 20, clamp plate or presser foot 26 and cam plate 29 into the inoperative position shown in Figure 1 and hence out of the pathway of the board 16. The board is then slid into place, either with its tongued edge presented forwardly and inserted in the grooves of the stop elements 18, 18 (if that edge is to have the cut-out) or the grooved longitudinal edge of the board against the stops 18, 18 (if that edge is to have the cut-out). The board is then positioned on the template where the preselected region registers with the indentation or cut out in the template, at which time the operator will swing handle 22 clockwise from the position shown in Figure 1 into the right angular position shown in Figure 2, thereby rotating the clamp plate 26 over the board 16 or other work, and likewise rotating the cam plate 29 into pressing relation with the adjacent edge of the board 16.

The handle 22 is then raised into the vertical position shown in Figures 4 and 8, thereby bringing the cam action ears 24 of the handle 22 into play, thereby forcing the clamp plate 26 downward, bringing its free end 26ª into firm pressing relation with the board to be operated on.

During rotation of post 20, cam plate 29 also swings into operative position bringing its arcuate cam surface against the rear edge of the board and forcing it snugly and uniformly against the stops 18, 18; this being accomplished as soon as the operating handle 22 has been swung to the right angle position as shown in Figure 2 and hence before the handle 22 is swung upwardly into the position indicated in Figures 3, 4 and 8.

In order to ensure firm clamping action, the rear end of the clamp member 26 is bent downwardly as at 35 to contact the top of the table or template 15 or the wear plate 33 during the downward movement of the clamp plate or member 26 as shown in Figure 8, namely, just prior to handle 22 completing its full upright vertical position, thus greatly increasing the pressure due to the slight spring action of the curved portion 28 of the clamp member or plate 26.

With the board or work firmly clamped in place as just described, the worker—by means of a suitable cutting tool—may now proceed to cut out a section of the board, having a contour and size of the template cavity or recess 17, see Figure 1.

It is apparent that where the board cut-outs are to be made in the matching edges of two edgewisely adjacent boards so that each board will receive the insert or tie anchor, after the tongued edge of the board has been cut out, the clamp 26 is released by swinging handle 22 downward into the position shown in Figure 2 and then swinging the handle into the position shown in Figure 1 and thereby rotating the post 20, shifting the clamp 26 toward on side as shown in Figure 1 and moving cam member 29 out of contact with the board.

The operator may now replace the cut-out board with the matching board by placing or presenting the grooved edge of the next board forwardly toward the stops which will engage the edges of the board in advance of the valley of the groove. The operator then operates the handle 22 in the manner previously described so as to snugly hold the grooved edge of the board against the stops and to clamp the board firmly in place.

Attempts heretofore have been made for maintaining the board or metal piece in place during cutting operation, but in view of the terrific resistance encountered—for example, when the cutter engages a knot in the wood—that unless a rigid and non-shiftable pressure element or cam is employed, the element operated on very often shifts rearwardly which, naturally, results in an untrue cut-out. With my improved clamping means shifting or movement of the element operated on is absolutely impossible.

Although my improved clamp has been especially described for use with a cut-out jig, it is apparent it is equally adapted for other uses, the invention having been described in terms of description and not in terms of limitation.

What I claim is:

1. In a cut-out jig, a bed plate or template provided along one of its edges with the desired configuration of cut-out, work-holding stops adjacent opposite sides or ends of said cut-out, a rotatable vertically disposed post mounted in said plate removed a predetermined distance transversely of said cut-out, a cam plate mounted on said post to rotate therewith said post and arranged on said template so as to engage the work to be operated on and press the work firmly against said stops, a clamp plate mounted on said post to rotate therewith a distance removed above said cam plate and adapted to move across the top of the work and have pressing engagement therewith, a spring mounted on said post for yieldingly holding said clamp plate in normal spaced relation with the cam plate, an operating handle pivotally secured to said post and normally disposed at right angles thereto; and means arranged to rotate with said handle and to engage said clamp plate whereby the latter is depressed against the action of said spring when said handle is swung upwardly in alignment with said vertical post.

2. In a cut-out jig with a template provided at one of its edges with the desired cut-out configuration, work-holding stops arranged adjacent the forward edge of the template and at opposite sides of the configuration; a rotatably mounted post a prearranged distance removed from the forward edge held against vertical movement and provided with a non-circular portion; a cam plate mounted on the non-circular portion of said post so as to rotate with the latter on the template and to force the work into firm relation with said stops; a work-clamping member mounted on the non-circular portion of said post at a distance above said cam plate; spring means whereby the cam plate and clamp member are yieldingly held apart; and a handle pivotally secured to said post and having cam action surfaces adapted to engage the top of said clamp member and to depress said clamp member into work-clamping position when said handle is swung into position.

3. In a jig of the character described provided with a template having a preselected design or operating zone at its forward edge and with work stops adjacent the forward edge of the template; a rotatable member arranged rearward transversely of said zone; a work-positioning member and a clamping member secured to said rotatable member so as to rotate therewith, said positioning member and clamping member being arranged in predetermined spaced relation axially on said rotatable member to rotate therewith whereby the element to be operated on is forced toward the operating zone by the positioning member in advance of the clamping action by said clamping member; yielding means intermediate the positioning member and said clamping member for yieldingly maintaining their spaced relation; and an operating handle for rotating said rotatable member and pivotally connected thereto to swing into parallel alignment with the axis of the rotatable member and provided with a cam action surface at its pivoted end arranged to engage the clamping member for depressing said clamping member against the action of said yielding means and into clamping relation with the element to be operated on.

4. In a jig of the character described provided with a template having a preselected cutout design or operating zone at its forward edge, work stops secured to the template at opposite sides of said zone; a vertically disposed post mounted on the template to rotate; a cam member arranged on said post to rotate therewith into engagement with the element to be operated on for forcing the work element against said stops; a clamp member arranged on said post above said cam member vertically slidable on said post to rotate therewith and provided with a fulcrum-providing rear end when the clamp member is depressed; and an operating handle pivotally secured to said post above said clamp member for rotating the post and having a cam action portion adjacent the handle pivot for engaging said clamp member whereby the clamp member is pressed into work-clamping position when said handle is raised into vertical alignment with said post and the work released when the handle is swung downwardly.

5. In a jig of the character described provided with work stop means, a rotatable post, means rotatable with said post whereby the element to be operated on is forced and held against said stop means, a clamp member also rotatable with said post, a handle operatively connected to said post for rotating the same, and cam means interposed between said handle and said clamp member for moving the latter into clamping engagement with said element while the same is held against said stop means as aforesaid.

References Cited in the file of this patent
UNITED STATES PATENTS

| | | |
|---|---|---|
| 230,157 | Sutherland | July 20, 1880 |
| 626,718 | Pearson | June 13, 1899 |
| 706,079 | Mechlin | Aug. 5, 1902 |
| 738,612 | Hipolito | Sept. 8, 1903 |
| 1,201,612 | Norris | Oct. 17, 1916 |